(12) United States Patent
Lee (10) Patent No.: US 12,285,854 B2
(45) Date of Patent: Apr. 29, 2025

(54) DELIVERY ROBOT

(71) Applicant: NEUBILITY INC., Seoul (KR)

(72) Inventor: Sang Min Lee, Seoul (KR)

(73) Assignee: NEUBILITY INC., Seoul (KR)

( * ) Notice: Subject to any disclaimer, the term of this patent is extended or adjusted under 35 U.S.C. 154(b) by 0 days.

(21) Appl. No.: 18/728,363

(22) PCT Filed: Nov. 22, 2022

(86) PCT No.: PCT/KR2022/018456
§ 371 (c)(1),
(2) Date: Jul. 11, 2024

(87) PCT Pub. No.: WO2023/149626
PCT Pub. Date: Aug. 10, 2023

(65) Prior Publication Data
US 2024/0416526 A1 Dec. 19, 2024

(30) Foreign Application Priority Data
Feb. 3, 2022 (KR) .......................... 10-2022-0014032

(51) Int. Cl.
*B25J 11/00* (2006.01)
*B25J 5/00* (2006.01)
*B25J 19/00* (2006.01)

(52) U.S. Cl.
CPC ............ *B25J 11/008* (2013.01); *B25J 5/007* (2013.01); *B25J 19/00* (2013.01)

(58) Field of Classification Search
None
See application file for complete search history.

(56) References Cited

U.S. PATENT DOCUMENTS

| | | | |
|---|---|---|---|
| 2,361,525 A * | 10/1944 | Ball | A47B 96/16 312/274 |
| 2,455,154 A * | 11/1948 | Bailey | A47B 96/16 312/307 |
| RE27,558 E * | 1/1973 | Phelps | A47B 81/064 312/8.5 |

(Continued)

FOREIGN PATENT DOCUMENTS

| | | |
|---|---|---|
| JP | 2000-153738 A | 6/2000 |
| JP | 2016-130964 A | 7/2016 |

*Primary Examiner* — Mark C Hageman
(74) *Attorney, Agent, or Firm* — Bridgeway IP Law Group, PLLC; Sang Ho Lee; Hyun Woo Shin (57) ABSTRACT

A delivery robot includes: an inner box provided with a receiving space whose upper part is opened; a hinge bracket fixed to one side of the inner box; an actuator placed on one side of the inner box and configured to lift the rod up and down; a rail arranged vertically outside the inner box; a cover assembly partially connected to the rod, installed on the hinge bracket, and configured to rotate around a first axis according to a lifting operation of the rod to open an upper part of the inner box; a tray placed in a receiving space of the inner box; a lift wheel unit fixed to the tray and configured to move up and down along the rail; a first link installed on the lift wheel unit to rotate around the second axis; and a second link whose one side is connected to the first link to rotate around a third axis and whose other side is connected to the cover assembly to rotate around a fourth axis.

5 Claims, 11 Drawing Sheets

(56) References Cited

U.S. PATENT DOCUMENTS

| | | | | |
|---|---|---|---|---|
| 4,568,132 | A * | 2/1986 | Watt | A47B 51/00 |
| | | | | 312/271 |
| 2013/0037445 | A1 * | 2/2013 | Williams | A47F 3/06 |
| | | | | 206/761 |
| 2020/0231366 | A1 | 7/2020 | Väin et al. | |
| 2020/0393854 | A1 * | 12/2020 | Romanucci | B66F 9/24 |
| 2021/0395011 | A1 | 12/2021 | Crawford, Jr. et al. | |

* cited by examiner

DELIVERY ROBOT

TECHNICAL FIELD

The present invention relates to a delivery robot capable of loading goods at a starting point and delivering them to a destination.

BACKGROUND ART

Generally, goods delivery is to load goods onto a means of transportation and transport them from a starting point to a destination. As technology advances, a delivery process can be assisted by a delivery robot. A delivery robot can set its own path when a destination is described, avoid obstacles, and move to a destination. In addition, delivery robot can move goods with minimal human intervention.

A delivery robot is provided with a box-shaped storage space, a cover assembly is placed on the top of the box, and a cover can be installed on the box with a hinge configuration.

That is, the delivery robot can safely move goods by placing them inside a box and delivering them with the cover closed.

However, a delivery robot configured as described above has the following problems.

A cover can be thickly arranged for insulation, and electronic equipment for communication functions and obstacle recognition, etc. can be equipped. For this reason, the cover can be manufactured to be heavy, and the size of the cover can be increased as the carrying capacity increases.

In addition, the box can be made wider and deeper to increase the carrying capacity. In this case, when putting goods in or taking them out of a box, users have to bend over excessively, which can be uncomfortable, and there is a risk of dropping or damaging goods. This can cause pain to users.

RELATED ART DOCUMENT

Patent Document (Patent Document 1) KR 10-2000-0126880 A

DISCLOSURE

Technical Problem

Therefore, the present invention has been made in view of the above problems, and it is one object of the present invention to provide a delivery robot that allows an opening and closing operation of a cover assembly to be automatically performed, allows a tray to move up and down inside a box, and allows the lifting operation of the tray to be linked with the opening and closing operation of the cover assembly.

It is another object of the present invention to provide a delivery robot configured to raise a tray when opening a cover so that a user does not have to bend his back excessively when loading or unloading goods.

Technical Solution

Therefore, the present invention has been made in view of the above problems, and it is one object of the present invention to provide a delivery robot, including: an inner box 12 provided with a receiving space whose upper part is opened; a hinge bracket 16 fixed to one side of the inner box 12; an actuator 20 placed on one side of the inner box 12 and configured to lift the rod 22 up and down; a rail 30 arranged vertically outside the inner box 12; a cover assembly 40 partially connected to the rod 22, installed on the hinge bracket 16, and configured to rotate around a first axis 81 according to a lifting operation of the rod 22 to open an upper part of the inner box 12; a tray 50 placed in a receiving space of the inner box 12; a lift wheel unit 60 fixed to the tray 50 and configured to move up and down along the rail 30; a first link 71 installed on the lift wheel unit 60 to rotate around the second axis 82; and a second link 72 whose one side is connected to the first link 71 to rotate around a third axis 83 and whose other side is connected to the cover assembly 40 to rotate around a fourth axis 84.

In addition, in the delivery robot according to an embodiment of the present invention, the tray 50 may start to rise after a portion of the cover assembly 40 is opened when the cover assembly 40 is opened from a closed state.

In addition, in the delivery robot according to an embodiment of the present invention, a stopper 73 may be installed on one of the first link 71 and the second link 72, and a pocket 74 may be formed on another one thereof, and the first link 71 and the second link 72 may be unfolded while rotating around the third axis 83, rise of the tray 50 may be stopped until the stopper 73 touches the pocket 74, and the cover assembly 40 may be opened.

In addition, in the delivery robot according to an embodiment of the present invention, when the cover assembly 40 is closed in an open state, lowering of the tray 50 may be first completed before the cover assembly 40 is closed, and then the cover assembly 40 may be closed.

In addition, in the delivery robot according to an embodiment of the present invention, a first wheel assembly 65 and second wheel assembly 66 of the lift wheel unit 60 may be placed on opposite sides of the rail 30, respectively, and a plurality of wheels 67 may be arranged to be spaced apart from each other in a vertical direction in each of the first and second wheel assemblies 65 and 66.

Specific details of other embodiments are included in the detailed description and drawings.

Advantageous Effects

A delivery robot according to an embodiment of the present invention configured as described above has the effect of automatically opening and closing a cover assembly, thereby eliminating user's burden regarding the weight and size of the cover assembly In addition, the delivery robot according to an embodiment of the present invention has the effect of increasing user convenience by allowing a tray to be lifted in the inside of an inner box and allowing the tray to be at an upper limit position when a cover assembly is fully opened, thereby allowing a user to load goods onto or unload goods from a tray without excessively bending the waist.

Further, the delivery robot according to an embodiment of the present invention has the effect of simplifying the configuration for implementing the lifting operation of the tray by configuring the lifting operation of the tray to be linked with the opening and closing operation of the cover assembly.

DESCRIPTION OF DRAWINGS

FIGS. 2 to 5 illustrate a state in which the cover assembly of the delivery robot according to an embodiment of the present invention is opened. Particularly.

FIGS. 7 to 11 illustrate the operation of the delivery robot according to an embodiment of the present invention.

BEST MODE

The advantages and features of the present invention and a method for achieving the present invention will become clear with reference to embodiments described in detail below together with the attached drawings.

Hereinafter, embodiments of the present invention will be described in detail with reference to the attached drawings. It should be understood that embodiments described below are provided as examples to help understand the present invention, and the present invention can be implemented in various ways different from the embodiments described herein. However, if it is judged that a specific description of a related known function or component may unnecessarily obscure the gist of the present invention when explaining the present invention, the detailed description and specific illustration are omitted. In addition, the attached drawings are not drawn to scale to help understand the invention and some components may be drawn with exaggerated sizes.

Meanwhile, the terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention.

On the other hand, terms described below are terms established in consideration of their functions in the present invention, and may vary depending on the manufacturer's intention or custom, so their definitions should be made based on the contents throughout this specification.

Throughout the specification, like reference numerals in the drawings denote like elements.

DESCRIPTION OF SYMBOLS

| | |
|---|---|
| 10: outer box | 12: inner box |
| 14: lift slot | 16: hinge bracket |
| 20: actuator | |
| 22: rod | 24: link |
| 30: rail | |
| 40: cover assembly | 42, 44: first and second brackets |
| 50: tray | |
| 60: lift wheel unit | 62: lift block |
| 63, 64: first and second panels | 65, 66: first and second wheel assemblies |
| 67: wheel | 68: installation hole |
| 71, 72: first and second links | |
| 73: stopper | 74: pocket |
| 81~84: first to fourth axes | |

BEST MODE

Figure 1:
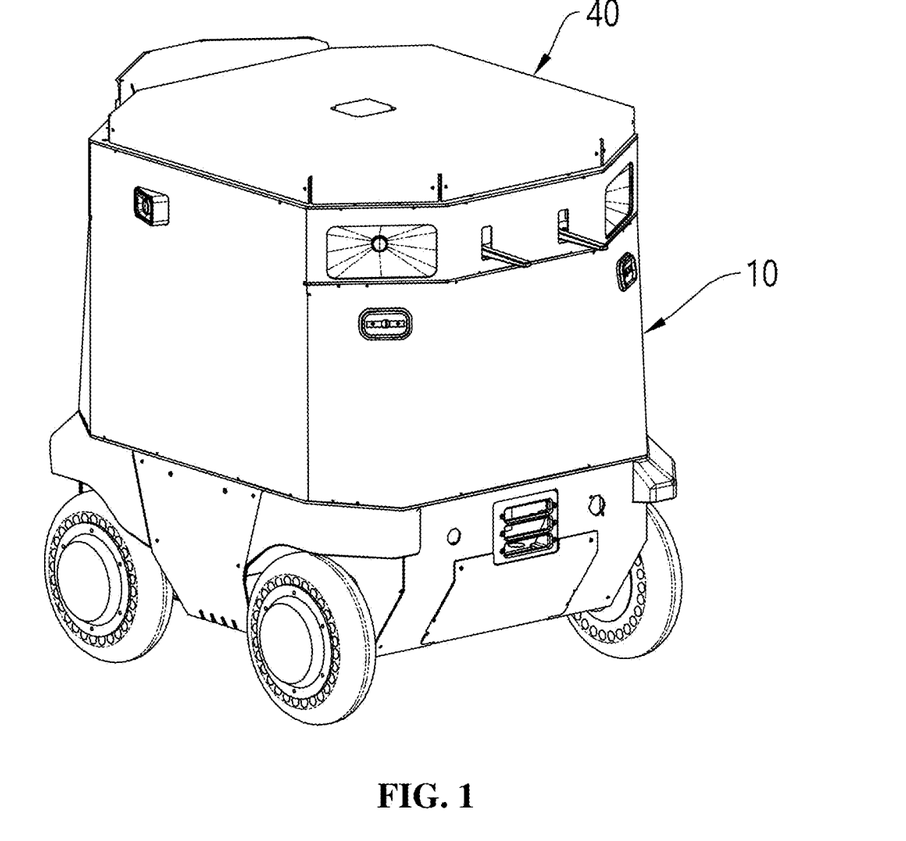
FIG. 1 illustrates a delivery robot according to an embodiment of the present invention, and particularly illustrates a state in which a cover assembly is closed.
Figure 2:
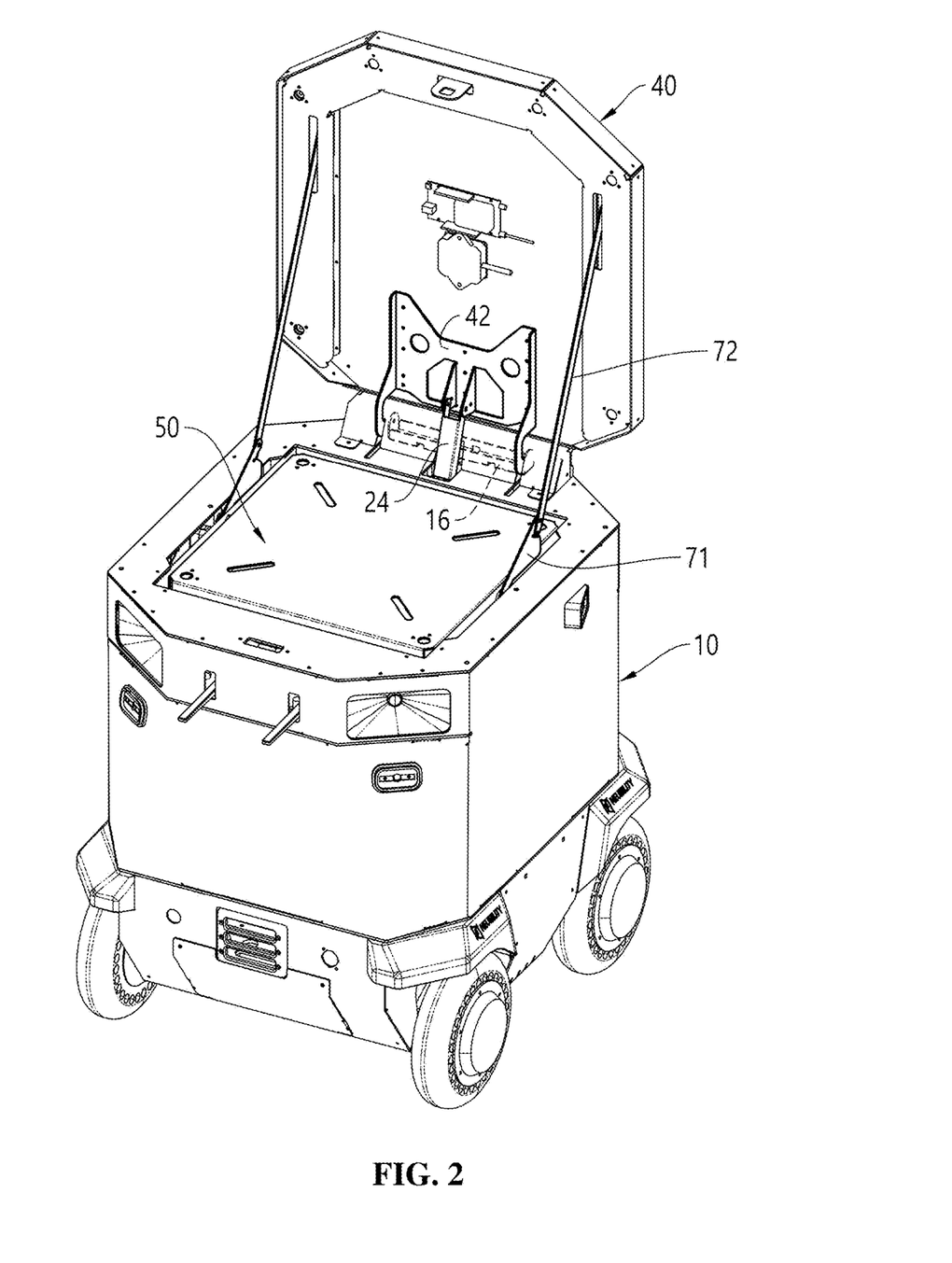
FIG. 2 illustrates the overall configuration in a state in which the cover assembly is opened.
Figure 3:
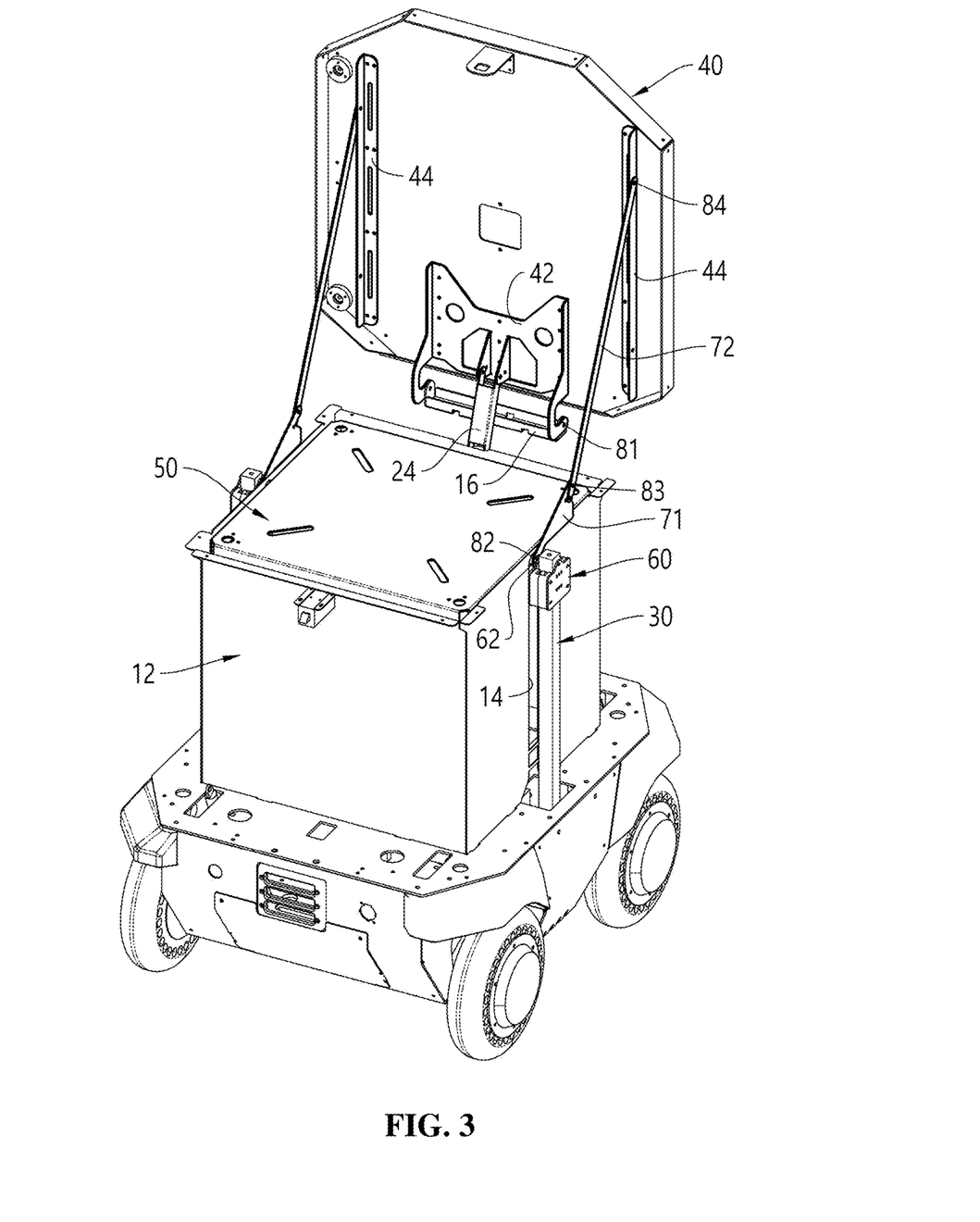
FIG. 3 illustrates a state in which an outer box is omitted such that an inner box is visible.
Figure 4:
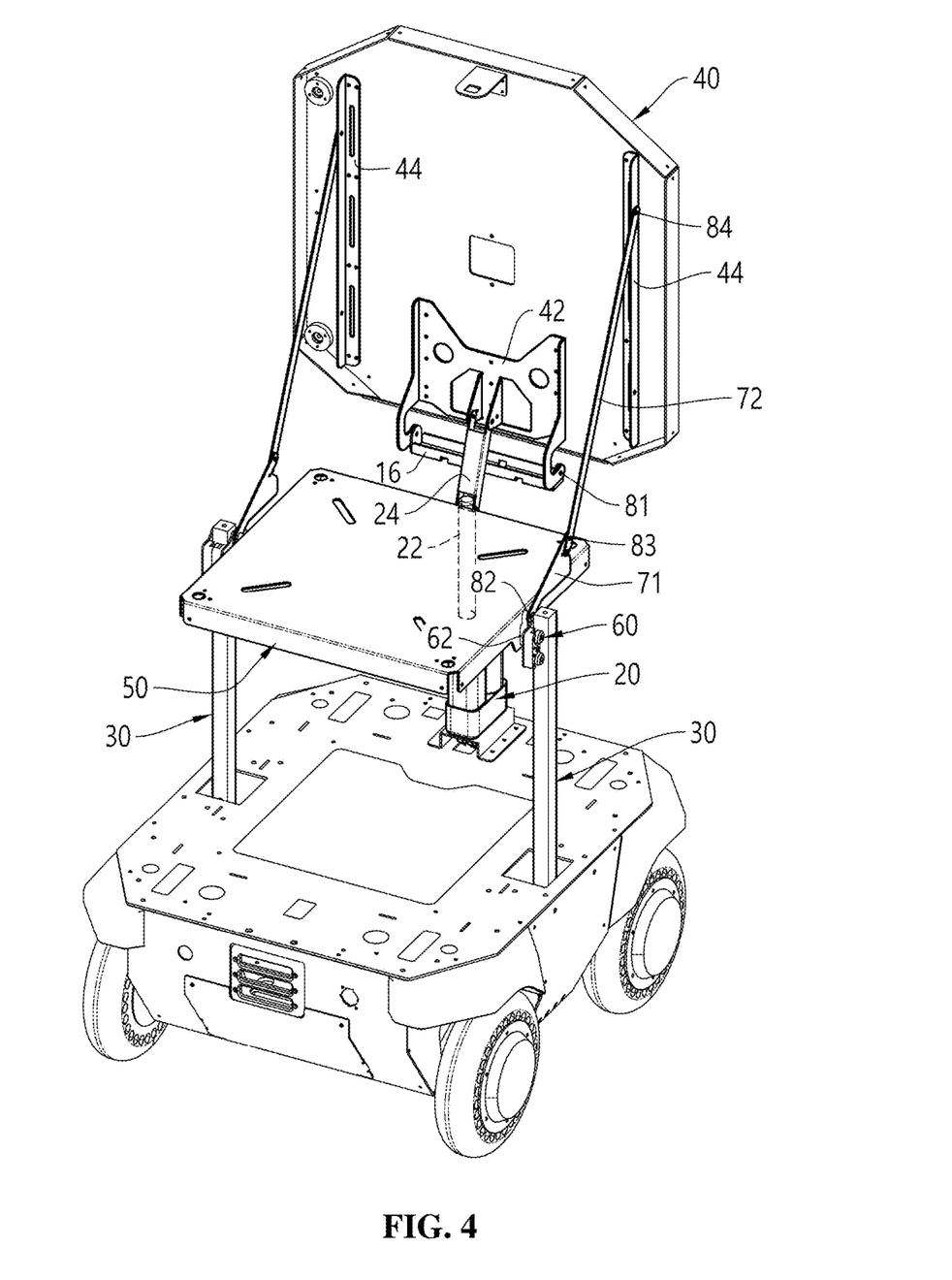
FIG. 4 illustrates a state in which the inner box and the outer box are omitted.
Figure 5:
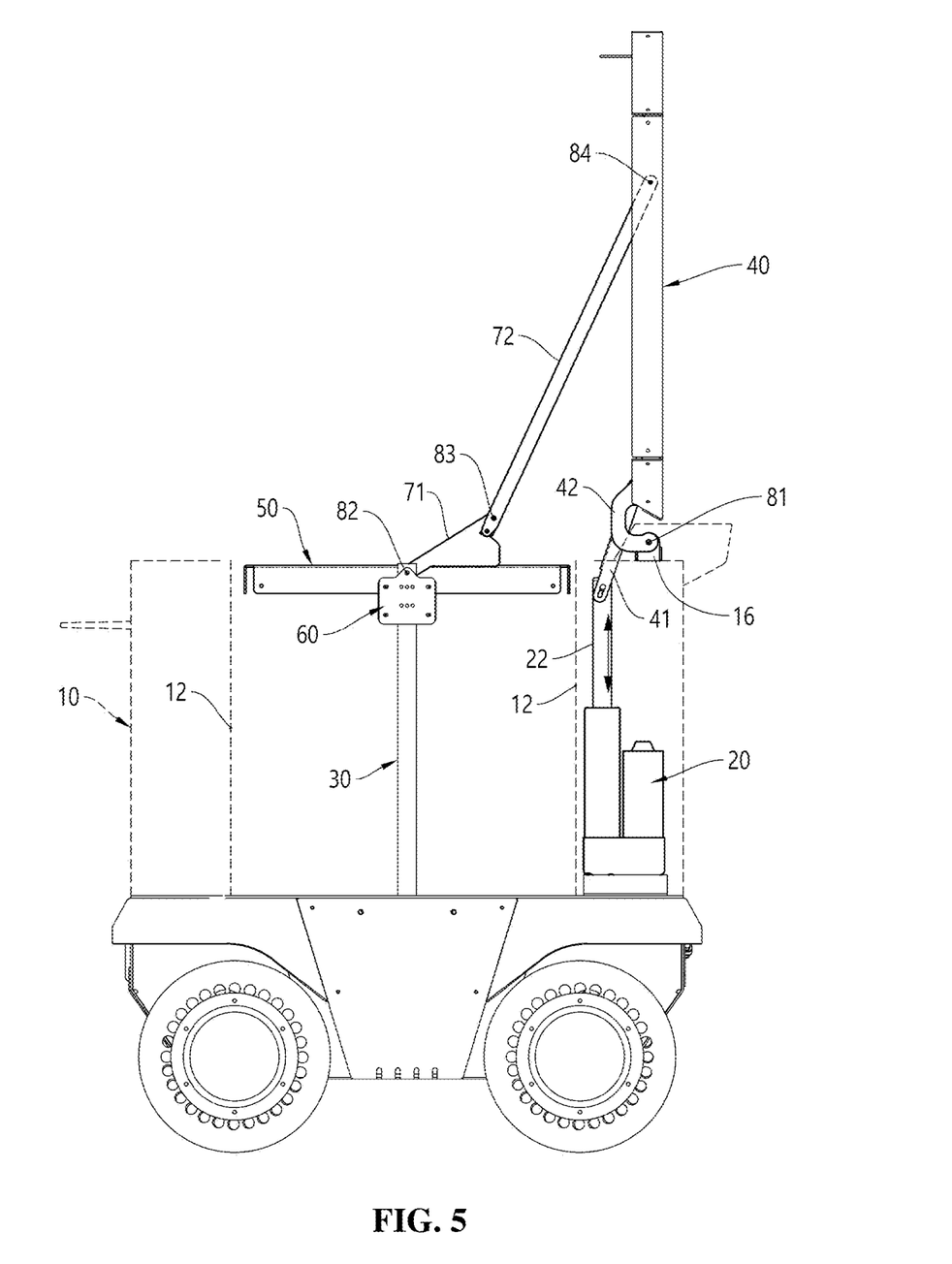
FIG. 5 illustrates a side view of FIG. 4.
Figure 6:
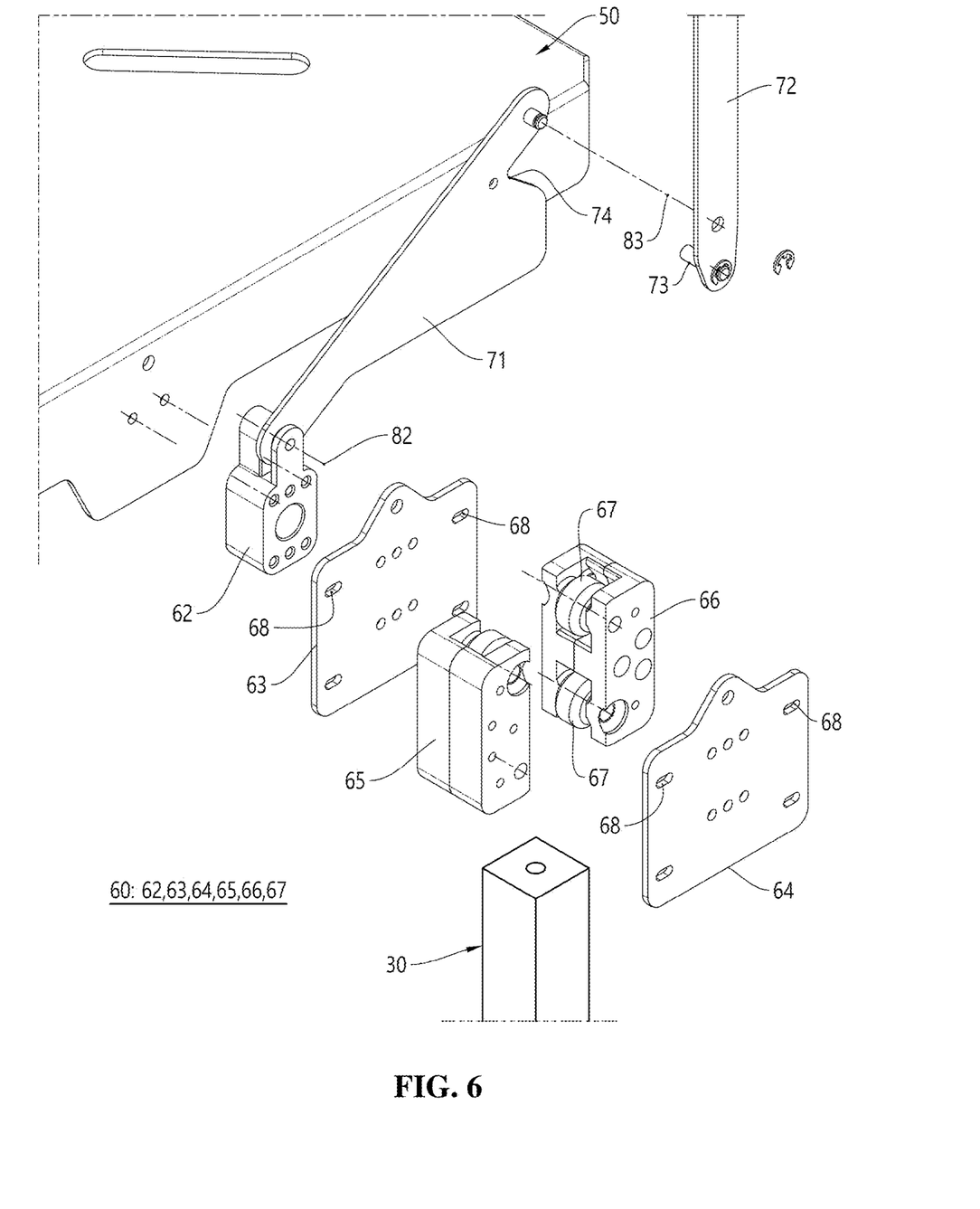
FIG. 6 illustrates a lift wheel unit in the delivery robot according to an embodiment of the present invention.

Hereinafter, a delivery robot according to an embodiment of the present invention is described with reference to FIGS. 1 to 6. FIG. 1 illustrates a delivery robot according to an embodiment of the present invention, and particularly illustrates a state in which a cover assembly is closed. FIGS. 2 to 5 illustrate a state in which the cover assembly of the delivery robot according to an embodiment of the present invention is opened. Particularly, FIG. 2 illustrates the overall configuration in a state in which the cover assembly is opened, FIG. 3 illustrates a state in which an outer box is omitted such that an inner box is visible, FIG. 4 illustrates a state in which the inner box and the outer box are omitted, and FIG. 5 illustrates a side view of FIG. 4. FIG. 6 illustrates a lift wheel unit of the delivery robot according to an embodiment of the present invention.

The delivery robot according to an embodiment of the present invention may include an inner box 12, a hinge bracket 16, an actuator 20, a rail 30, a cover assembly 40, a tray 50, a lift wheel unit 60 and first and second links 71 and 72.

The inner box 12 may be placed inside an outer box 10, a space may be formed between the inner box 12 and the outer box 10, and an insulating material, a shock absorber, etc. may be placed.

As shown in FIG. 3, a lift slot 14 may be formed to vertically perforate a side surface of the inner box 12. In addition, the inner box 12 may be provided with a receiving space whose upper part is opened.

As shown in FIG. 2, the hinge bracket 16 may be fixedly installed on one side of the outer box 10 or the inner box 12.

As shown in FIGS. 4 and 5, the actuator 20 may be disposed on one side of the inner box 12, and may move a rod 22 up and down. The actuator 20 may include a motor and a worm gear, the rod 22 may include a gear, and, as the motor operates, the worm gear is engaged with the gear of the rod 22 to raise and lower the rod 22. This technology is a known technology and can be easily understood by those in the industry, so a more detailed description is omitted.

As shown in FIG. 3, the rail 30 is arranged vertically outside the inner box 12. The wheels 67 of the rail 30 may run along opposite side surfaces.

A portion of the cover assembly 40 may be connected to the rod 22 and installed on the hinge bracket 16. In addition, the cover assembly 40 may be rotated around a first axis 81 according to the lifting operation of the rod 22 to open the upper part of the inner box 12.

First and second brackets 42 and 44 may be installed on the cover assembly 40, and the first bracket 42 may be axially coupled to the hinge bracket 16 to form the first axis 81.

In addition, the first bracket 42 is coupled to one side of a link 24, and another side of the link 24 is coupled to the rod 22.

That is, when the rod 22 moves up and down as the actuator 20 operates, the cover assembly 40 is pushed or pulled via the link 24 to be opened or closed.

The tray 50 may be placed in the receiving space of the inner box 12, and the top surface of the tray 50 may be formed flat so that goods can be placed thereon.

Meanwhile, a buffering material may be installed on the bottom surface of the tray 50, thereby mitigating the impact of the tray 50 colliding with other components when it reaches the lower limit.

The lift hill unit 60 may be fixed to the tray 50 and may move up and down along the rail 30. The lift wheel unit 60 reduces resistance when the tray 50 is lifted, keeps the upper surface of the tray 50 horizontal, and prevents it from tilting.

The first link 71 may be installed on the lift wheel unit 60 and rotate around a second axis 82.

One side of the second link 72 may be connected to the first link 71 to rotate around a third axis 83, and another side of the second link 72 may be connected to the cover assembly 40 to rotate around a fourth axis 84.

More specifically, the fourth axis 84 is a center where the second link 72 and the second bracket 44 rotate to fold or unfold as the second link 72 is connected to a second bracket 44 installed on the cover assembly 40.

The delivery robot according to an embodiment of the present invention configured as described above has the effect of automatically opening and closing the cover assembly 40 by operating the actuator 20, thereby eliminating user's burden regarding the weight and size of the cover assembly.

In addition, the user can maintain the upright position of the cover assembly 40 even if the cover assembly 40 is not supported, and the cover assembly 40 does not fall freely, so it is safe from the risk of accidents.

In addition, the delivery robot according to an embodiment of the present invention may prevent goods loaded on the tray 50 from being disturbed or falling out by allowing the tray 50 to be lifted in the inside of the inner box.

In addition, the delivery robot according to an embodiment of the present invention has the effect of increasing user convenience by allowing the tray 50 to be at the upper limit position when the cover assembly 40 is fully opened, thereby allowing the user to load goods onto or unload goods from a tray without excessively bending the waist.

In addition, the delivery robot according to an embodiment of the present invention has the effect of simplifying the configuration for implementing the lifting operation of the tray 50 by configuring the lifting operation of the tray 50 to be linked with the opening and closing operation of the cover assembly 40.

FIGS. 7 to 11 illustrate the operation of the delivery robot according to an embodiment of the present invention.

Figure 7:
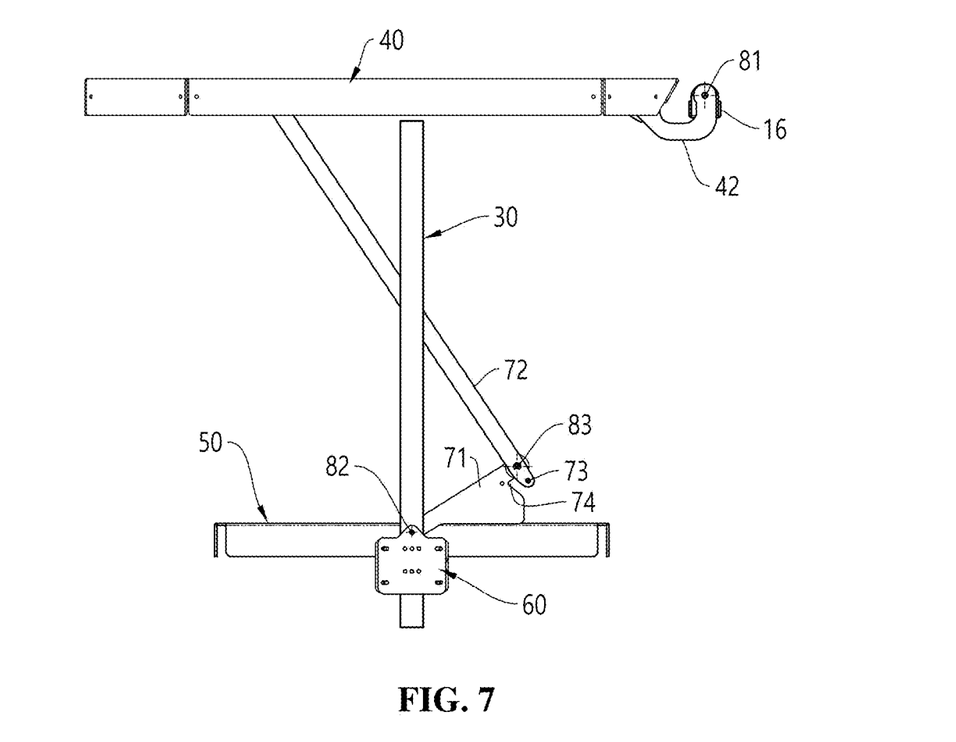
FIG. 7 illustrates a state in which a cover assembly is closed and a tray is at a lowered position.

FIG. 7 illustrates a state in which the cover assembly 40 is closed and the tray 50 is at a lowered position.

Figure 8:
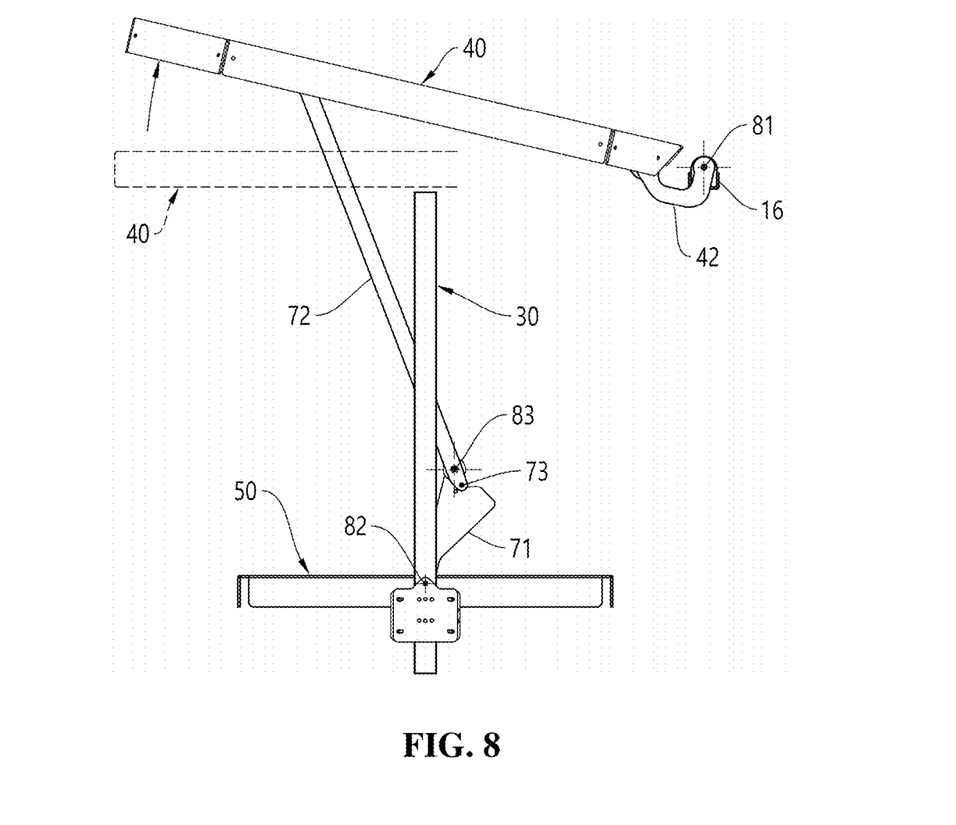
FIG. 8 illustrates a state in which the cover assembly is partially opened and the tray is at a lowered position.

FIG. 8 illustrates a state in which a portion of the cover assembly 40 is opened and the tray 50 is at a lowered position. That is, in the delivery robot according to an embodiment of the present invention, the tray 50 may remain in place during an initial stage of opening the cover assembly 40.

If the opening of the cover assembly 40 and the elevation of the tray 50 occur simultaneously when the tray 50 is fully loaded with goods, a portion of the goods may collide with the cover assembly 40. However, the delivery robot according to an embodiment of the present invention can fundamentally prevent the problem of goods loaded on the tray 50 colliding with the cover assembly 40 by ensuring that the height of the tray 50 does not change even when the cover assembly 40 is opened to a certain extent.

Referring to FIG. 8, when the cover assembly 40 starts to open, the first link 71 and the second link 72 are spread out around the third axis 83, and when they are opened to a certain extent, the first link 71 and the second link 72 are no longer spread out, and the displacement of the first link 71 being pulled is applied to the second link 72 as it is.

Figure 9:
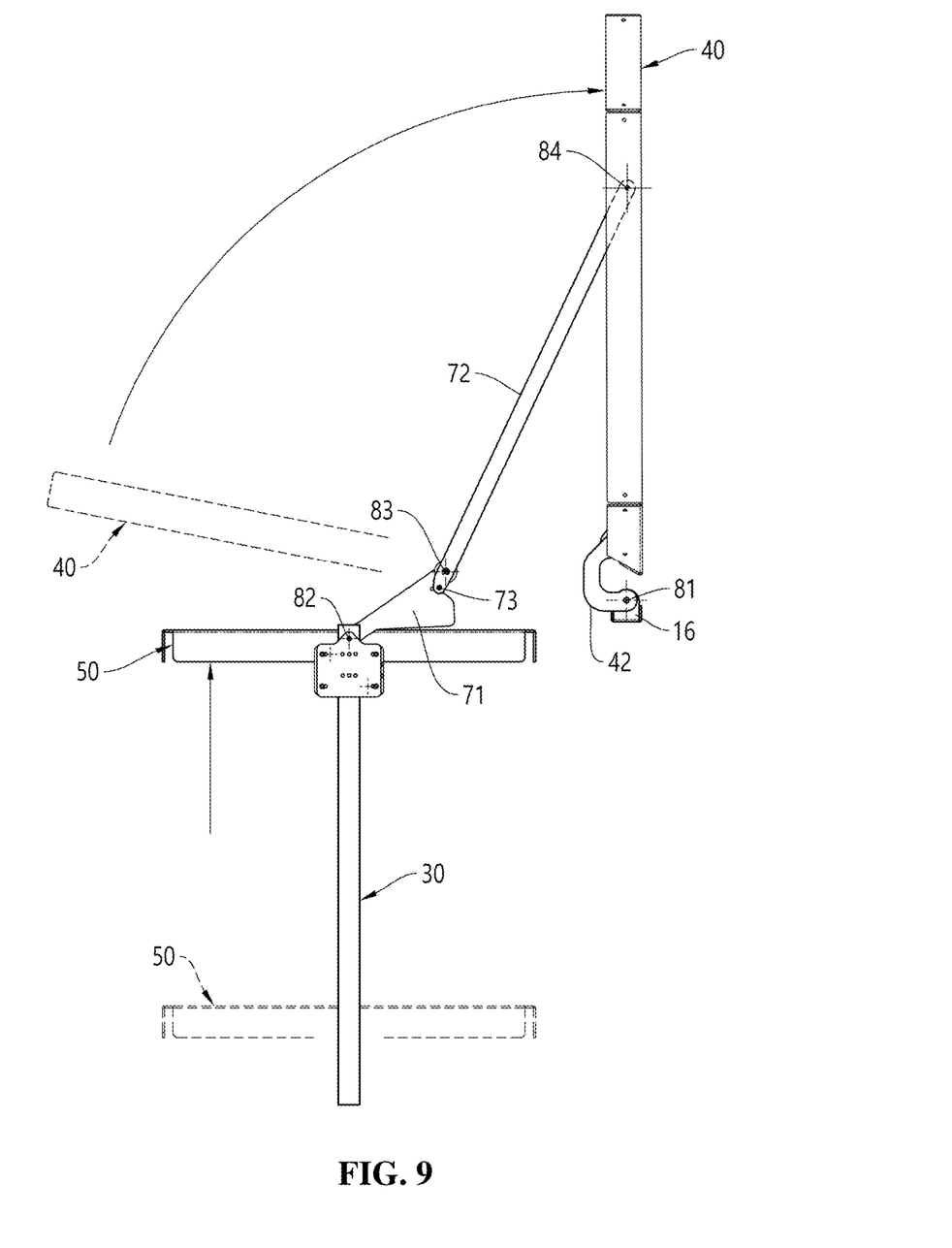
FIG. 9 illustrates a state in which the cover assembly is fully opened, and the tray is in a raised position.

FIG. 9 illustrates a state in which the cover assembly 40 is fully opened and the tray 50 is in a raised position. As described with reference to FIG. 8 above, the tray 50 may be raised by the rotational displacement when the cover assembly 40 is rotated to open if the first link 71 and the second link 72 do not rotate with each other.

Figure 10:
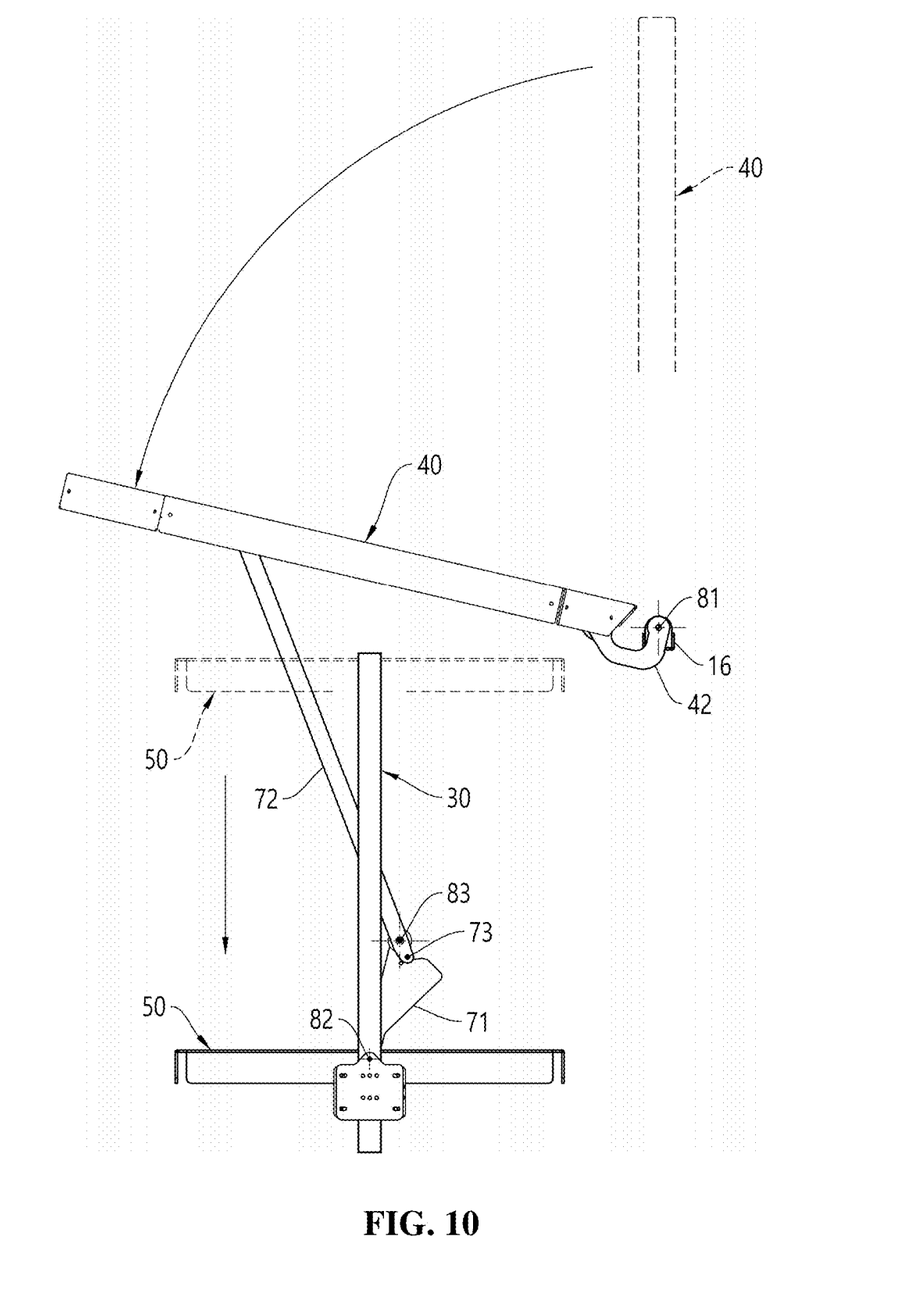
FIG. 10 illustrates a state in which the cover assembly is partially closed and the tray is at a lowered position.

FIG. 10 illustrates a state in which the cover assembly 40 is partially closed and the tray 50 is at a lowered position. When the cover assembly 40 rotates around the first axis 81, the tensile force applied to the first and second links 71 and 72 is released, and the tray 50 is subject to gravity, so the height of the tray 50 is lowered.

Before the cover assembly 40 is completely closed, the tray 50 may reach the lowered position. That is, the cover assembly 40 may be closed in a stable state as the tray 50 is lowered.

Figure 11:
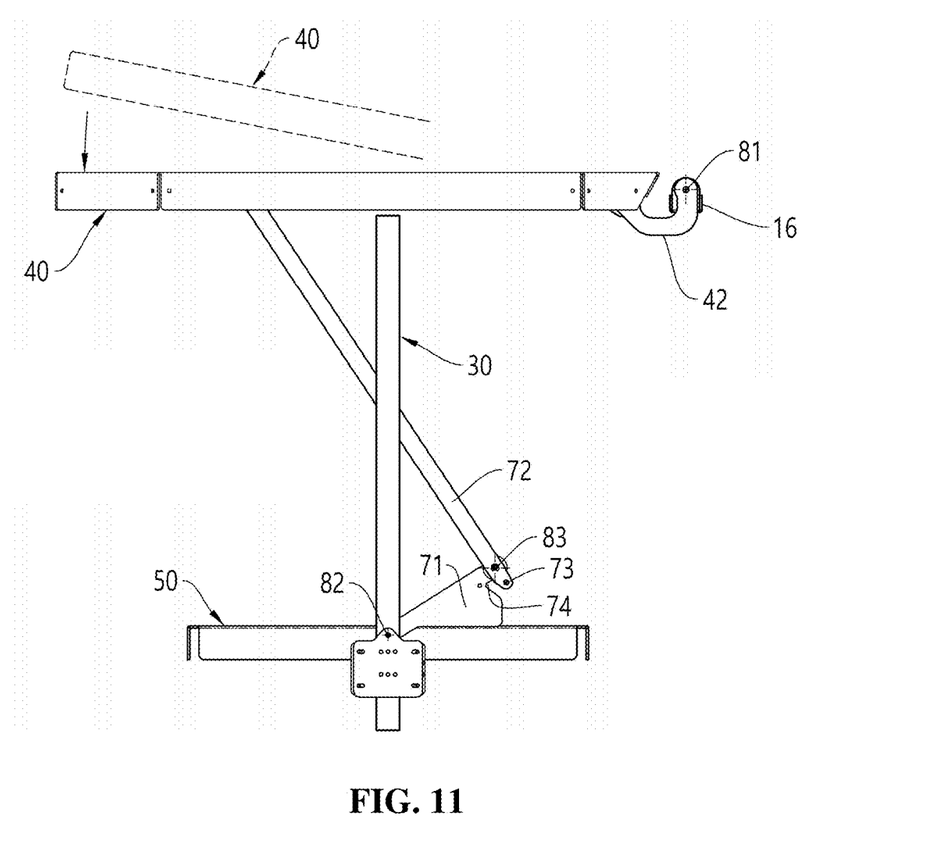
FIG. 11 illustrates a state in which the cover assembly is closed and the tray is at a lowered position.

FIG. 11 illustrates a state in which the cover assembly 40 is closed and the tray 50 is at a lowered position. Since the tray 50 is in the lowered position, it does not go down any further, and the posture can be stabilized. Next, the first link 71 and the second link 72 may be folded while rotating around the third axis 83.

In the delivery robot according to an embodiment of the present invention, the tray 50 may start to rise after a portion of the cover assembly 40 is opened when the cover assembly 40 is opened from the closed state, as described above. Accordingly, this may prevent goods loaded on the tray 50 from colliding with the cover assembly 40 and the goods from falling over or being damaged.

In addition, in the delivery robot according to an embodiment of the present invention, a stopper 73 may be installed on one of the first link 71 and the second link 72, and a pocket 74 may be formed on the other one thereof.

As shown in FIG. 8, when the cover assembly 40 is opened, the first link 71 and the second link 72 may be unfolded while rotating around the third axis 83, and the rise of the tray 50 may be stopped until the stopper 73 touches the pocket 74.

If the stopper 73 touches the pocket 74 when the cover assembly 40 is opened, the tray 50 can rise from that point on.

Meanwhile, in the delivery robot according to an embodiment of the present invention, when the cover assembly 40 is closed in the open state, lowering of the tray 50 may be first completed before the cover assembly 40 is closed, and then the cover assembly 40 may be closed.

This allows a user to inspect the goods with the naked eye. If the goods are visible even when the tray 50 has reached the lower limit position, this means that the cover assembly 40 cannot be closed. This allows the cover assembly 40 to stop closing before it is completely closed, even if the user mistakenly misjudges the size of the goods and realizes late that the goods are excessively large.

The lift wheel unit 60 is described in more detail with reference to FIG. 6.

A first wheel assembly 65 and second wheel assembly 66 of the lift wheel unit 60 may be placed on opposite sides of the rail 30, respectively.

A plurality of wheels 67 may be arranged to be spaced apart from each other in a vertical direction in each of the first and second wheel assemblies 65 and 66. More specifically, two or more wheels 67 may touch one side surface of the rail 30 to roll, and other two or more wheels 67 may touch an opposite side surface of the rail 30 to roll.

Accordingly, the lift wheel unit 60 may prevent the plural wheels 67 from tilting to one side when they run up and down along both the side surfaces of the rail 30, thereby preventing goods from spilling or falling over and, accordingly, delivering the goods more stably.

In addition, both side surfaces of the first and second wheel assemblies 65 and 66 may be fixed with first and second panels 63 and 64. In particular, on the first and second panels 63 and 64, installation holes 68 may be formed in the shape of thin and long holes rather than perfectly circular holes.

Accordingly, a gap between the first wheel assembly 65 and the second wheel assembly 66 may be finely adjusted, and a gap formed between the wheels 67 on both sides and the rail 30 may be adjusted.

When the gap is too narrow, the resistance may increase when the lift wheel unit 60 goes up and down along the rail 30, and conversely, if the gap is too wide, the lift wheel unit 60 may shake when going up and down, so the gap should be adjusted appropriately.

On the other hand, the lift wheel unit 60 may include a lift block 62. The lift block 62 may be fixed to the side surface of the tray 50, and the first link 71 may be connected thereto, thereby forming the second axis 82.

As shown in FIG. 3, a lift slit 14 may be formed on both side surfaces of the inner box 12, and the lift block 62 may be placed on the lift slit 14.

That is, the lift block 62 is positioned at a position penetrating the lift slit 14 when viewed from above, so that, based on the inner box 12 as a boundary, the tray 50 is placed inside the inner box 12, and the lift wheel unit 60 is placed outside the inner box 12.

When the delivery robot according to an embodiment of the present invention is assembled into a finished product, most of the lift wheel unit 60 may be hidden even if the cover assembly 40 is opened. As a result, the components for moving up and down the tray 50 may have appeared messy, but by covering them, a user may have a sense of order when visually feeling it.

Although the present invention has been described with reference to the attached drawings, those skilled in the art will understand that the present invention can be implemented in other specific forms without changing its technical idea or essential features.

Therefore, the embodiments described above should be understood as illustrative and not restrictive in all respects, and the scope of the present invention is indicated by claims described below, and all changes or modifications derived from the meaning and scope of the claims and their equivalent concepts should be interpreted as being included in the scope of the present invention.

INDUSTRIAL APPLICABILITY

A delivery robot according to an embodiment of the present invention can be used to deliver goods.

The invention claimed is:
1. A delivery robot, comprising:
an inner box having therein a receiving space, wherein an upper part of the inner box is configured to be opened;
a hinge bracket fixed to one side of the inner box;
an actuator disposed on the one side of the inner box and configured to lift a rod up and down;
a rail disposed vertically outside the inner box;
a cover assembly partially connected to the rod, installed on the hinge bracket, and configured to rotate around a first axis according to a lifting operation of the rod to open the upper part of the inner box;
a tray disposed in the receiving space of the inner box;
a lift wheel unit fixed to the tray and configured to move up and down along the rail;
a first link installed on the lift wheel unit to rotate around a second axis; and
a second link having one side thereof connected to the first link to rotate around a third axis and having an other side thereof connected to the cover assembly to rotate around a fourth axis.

2. The delivery robot according to claim 1, wherein the tray rises when a portion of the cover assembly is opened from a closed state.

3. The delivery robot according to claim 2, wherein a stopper is installed on one of the first link and the second link, and a pocket is formed on the other of the first link and the second link, and
wherein the first link and the second link are unfolded while rotating around the third axis, rise of the tray is stopped until the stopper touches the pocket, and the cover assembly is opened.

4. The delivery robot according to claim 1, wherein when the cover assembly is closed from an open state, lowering of the tray is first completed before the cover assembly is closed, and then the cover assembly is closed.

5. The delivery robot according to claim 1, wherein a first wheel assembly and a second wheel assembly of the lift wheel unit are disposed on opposite sides of the rail, respectively, and a plurality of wheels are arranged to be spaced apart from each other in a vertical direction in each of the first and second wheel assemblies.

* * * * *